United States Patent
Mazloum et al.

(10) Patent No.: US 12,439,434 B2
(45) Date of Patent: Oct. 7, 2025

(54) METHODS FOR CONTENTION-BASED SIDELINK TRANSMISSION AND RECEPTION AND RELATED WIRELESS DEVICES

(71) Applicant: Sony Group Corporation, Tokyo (JP)

(72) Inventors: Nafiseh Mazloum, Lund (SE); Torgny Palenius, Barsebäck (SE); Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 235 days.

(21) Appl. No.: 18/271,413

(22) PCT Filed: Jan. 18, 2022

(86) PCT No.: PCT/EP2022/050954
§ 371 (c)(1),
(2) Date: Jul. 7, 2023

(87) PCT Pub. No.: WO2022/157132
PCT Pub. Date: Jul. 28, 2022

(65) Prior Publication Data
US 2024/0306170 A1    Sep. 12, 2024

(30) Foreign Application Priority Data
Jan. 22, 2021 (SE) .................................. 2150069-9

(51) Int. Cl.
*H04W 72/02* (2009.01)
*H04W 4/46* (2018.01)
(Continued)

(52) U.S. Cl.
CPC ....... *H04W 72/40* (2023.01); *H04W 52/0235* (2013.01)

(58) Field of Classification Search
None
See application file for complete search history.

(56) References Cited

U.S. PATENT DOCUMENTS

| | | | |
|---|---|---|---|
| 11,576,148 B2 * | 2/2023 | Lee | H04W 72/56 |
| 2012/0224546 A1 | 9/2012 | Chang | |

(Continued)

OTHER PUBLICATIONS

International Search Report and Written Opinion from corresponding International Application No. PCT/EP2022/050954, mailed on May 4, 2022, 17 pages.
(Continued)

*Primary Examiner* — Sai Aung
(74) *Attorney, Agent, or Firm* — Tucker Ellis LLP

(57) ABSTRACT

Disclosed is a method performed by a wireless transmitter device, for contention-based sidelink transmission. The method comprises obtaining information defining a transmission resource pool and a resource reservation pool comprising one or more reservation resources associated with respective transmission resources in the transmission resource pool. The method comprises monitoring a reservation resource associated with a transmission resource selected by the wireless transmitter device for sidelink transmission, for a resource reservation signal transmitted by one or more other wireless transmitter devices attempting to reserve the same transmission resource. The method comprises: upon determining based on the monitoring that the transmission resource is available, transmitting, after the monitoring, to a wireless device, using the reservation resource, a resource reservation signal indicating that the wireless transmitter device intends to use the transmission resource. The timing of the transmission of the resource reservation signal is randomly selected by the wireless transmitter device.

19 Claims, 8 Drawing Sheets

(51) Int. Cl.
  *H04W 52/02* (2009.01)
  *H04W 72/04* (2023.01)
  *H04W 72/40* (2023.01)
  *H04W 92/18* (2009.01)

(56) References Cited

U.S. PATENT DOCUMENTS

| | | |
|---|---|---|
| 2015/0271786 A1 | 9/2015 | Xue |
| 2019/0132818 A1 | 5/2019 | Yasukawa |
| 2020/0029245 A1* | 1/2020 | Khoryaev ............ H04W 36/22 |
| 2020/0053647 A1* | 2/2020 | Chae .................. H04W 56/001 |
| 2020/0229205 A1* | 7/2020 | Bharadwaj ........... H04L 5/0053 |
| 2020/0267523 A1* | 8/2020 | Tang ..................... H04L 5/0044 |
| 2020/0288433 A1 | 9/2020 | Yu |
| 2021/0029585 A1* | 1/2021 | Bharadwaj ........... H04W 72/02 |
| 2021/0136783 A1* | 5/2021 | Fakoorian ............ H04W 76/14 |
| 2021/0204217 A1* | 7/2021 | Balasubramanian ....................... H04W 24/10 |
| 2021/0219268 A1* | 7/2021 | Li ........................ H04B 17/318 |
| 2021/0385685 A1* | 12/2021 | Khoryaev ............ H04W 72/02 |
| 2022/0353846 A1* | 11/2022 | Wang .................... H04L 1/1861 |

OTHER PUBLICATIONS

Office Action and Search Report from corresponding Swedish Application No. 2150069-9, mailed on Sep. 3, 2021, 11 pages.

InterDigital, Inc., "Sidelink Resource allocation for Power saving," 3GPP TSG RAN WG1 #102-e, R1-2006183, Aug. 17-28, 2020, 3 pages.

Rafael Molina-Masegosa et al., "Configuration of the C-V2X Mode 4 Sidelink PC5 Interface for Vehicular Communication," 2018 14th International Conference on Mobile Ad-Hoc and Sensor Networks (MSN), Dec. 6, 2018, 6 pages.

* cited by examiner

METHODS FOR CONTENTION-BASED SIDELINK TRANSMISSION AND RECEPTION AND RELATED WIRELESS DEVICES

The present disclosure pertains to the field of wireless communications. The present disclosure relates to methods for contention-based sidelink transmission and related wireless devices.

BACKGROUND

In wireless communications systems, a wireless device, (such as user equipment, UE, for example, a mobile phone or a wireless modem) can communicate with other wireless devices via a network node (such as a base station, BS, such as a next generation NodeB, gNB, evolved NodeB, eNB), or directly. Direct communication with other wireless devices is referred to as device-to-device communication or sidelink communication. In sidelink communication, the wireless device communicates data directly with one or more other wireless devices within its range or vicinity.

The Third Generation Partnership Project (3GPP) has started to adopt sidelink communication, for example, in Long Term Evolution, LTE, and New Radio, NR, such as for proximity-based services.

In NR, sidelink transmission, Tx, and reception, Rx, resource pools are configured either by a network node when the wireless device is in radio resource control connected, RRC_Connected, mode, or via system information block, SIB (such as SIB12) when the wireless device in operation is in idle mode and in-coverage. Wireless devices are typically also preconfigured (for example in factory or while still in-coverage) with special resources (preconfigured Tx/Rx pool) for use when out of coverage.

The selection of resources within the TxPool when transmitting data in the legacy sidelink is performed either by the RAN which allocates the resources where the wireless device is allowed to transmit, (referred to as Mode 1), or by the wireless device which senses the TxPool during a period in advance of the transmission to find resources which are not used, (referred to as Mode 2 e.g. in 3GPP TS 36.300 v16.2, e.g. in 3GPP TS 38.300 v16.9).

SUMMARY

When using the contention-based sidelink protocol (e.g. Mode 2) which is standardized e.g. in 3GPP TS 36.300 v16.2, e.g. in 3GPP TS 38.300 v16.9, the wireless device needs to sense the channel before transmitting. During sensing, the wireless device (e.g. in Mode 2, e.g. Sidelink Mode 2) is required to decode all signals in a randomly and/or autonomously selected transmission resource pool in order to find resources which are available and can be used for its data transmission. The sensing procedure can lead to considerable energy consumption at the wireless device intending to transmit. This can further result in a reduced battery life-time during which battery-powered wireless devices can maintain the sidelink communication channel. There is a need for solutions which are more power-efficient.

Accordingly, there is a need for devices and methods for contention-based sidelink transmission and reception, which mitigate, alleviate or address the shortcomings existing and provide resource selection which reduces the power consumption of the wireless device intending to transmit, in side-link communication, e.g. when operating in Mode 2.

Disclosed is a method performed by a wireless transmitter, Tx, device, for contention-based sidelink transmission. The method comprises obtaining information defining a transmission resource pool and a resource reservation pool comprising one or more reservation resources associated with respective transmission resources in the transmission resource pool. The method comprises: monitoring a reservation resource associated with a transmission resource selected by the wireless transmitter device for sidelink transmission, for a resource reservation signal transmitted by one or more other wireless transmitter devices attempting to reserve the same transmission resource. The method comprises: upon determining based on the monitoring that the transmission resource is available, transmitting, after the monitoring, to a wireless device, using the reservation resource, a resource reservation signal indicating that the wireless transmitter device intends to use the transmission resource. A timing of the transmission of the resource reservation signal is randomly selected by the wireless transmitter device.

Further, a wireless transmitter device is provided. The wireless transmitter device memory circuitry, processor circuitry, and a wireless interface. The wireless transmitter device is configured to perform any of the methods according to the disclosure, the device comprising:

It may be appreciated that the disclosed technique allows wireless transmitter, Tx, devices with limited battery resources to benefit from a low-power receiver sensing mechanism before initiating a sidelink transmission. The disclosed technique may lead a reduced collision at the transmission resource selected by the wireless transmitter device. The disclosed wireless transmitter device may benefit from a reduced power when operating in Mode 2. In other words, the disclosed technique may provide a more efficient sensing mechanism e.g. in terms of power consumption and/or latency.

Disclosed is a method, performed by a wireless receiver, Rx, device, for sidelink reception. The method comprises monitoring a reservation resource for a reservation resource signal. The method comprises receiving, from a wireless transmitter device, the reservation resource signal comprising a first part recognizable by any wireless device and a second part dedicated to a target wireless receiver device. The method comprises upon identifying that the second part indicates that the wireless receiver device is the target wireless receiver device, receiving the sidelink reception using a reception resource corresponding to the reservation resource.

Further, a wireless receiver device is provided. The wireless receiver device memory circuitry, processor circuitry, and a wireless interface. The wireless receiver device is configured to perform any of the methods according to the disclosure.

It is an advantage of the present disclosure that the disclosed wireless receiver device can benefit from a reception with reduced collision probability and reduced power consumption, since it only needs to monitor the reservation resource.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
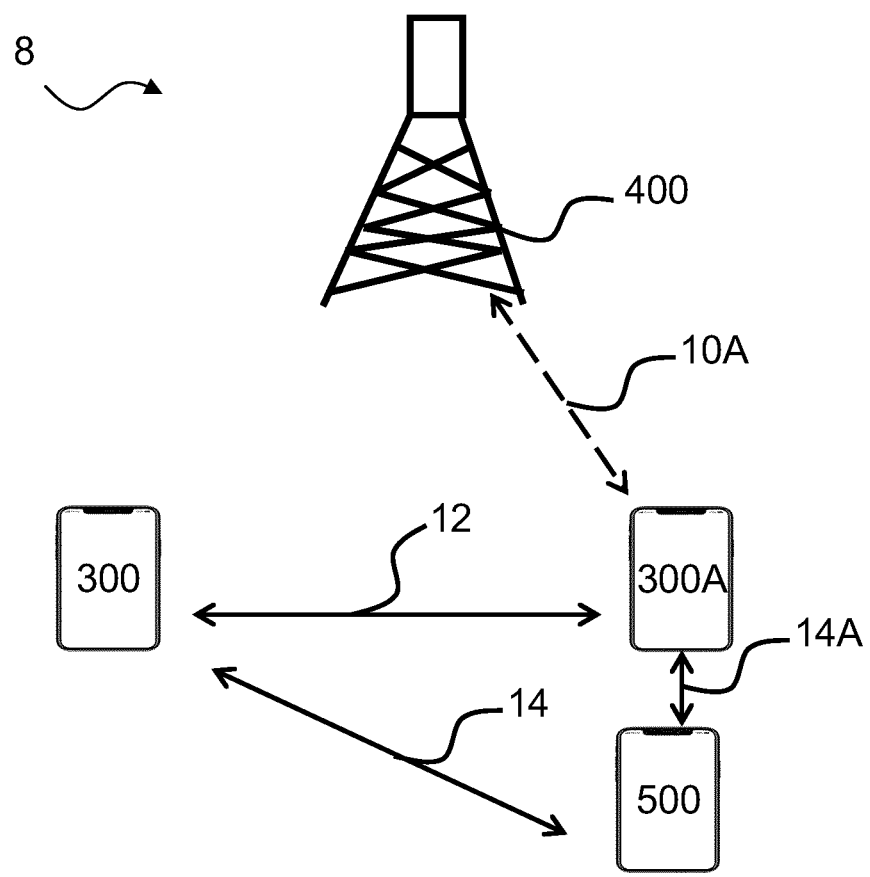
FIG. 1 is a diagram illustrating an example wireless communication system comprising an example wireless transmitter device and an example wireless receiver device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 8 comprising an example wireless transmitter device 300 and an example wireless receiver device 500 according to this disclosure.

As discussed in detail herein, the present disclosure relates to a wireless communication system 8 comprising a cellular system, for example, a 3GPP wireless communication system. The wireless communication system 8 comprises a wireless transmitter device 300 and optionally a network node 400.

A network node disclosed herein refers to a radio access network node operating in the radio access network, such as a base station, an evolved Node B, eNB, gNB in NR. In one or more examples, the RAN node is a functional unit which may be distributed in several physical units.

The wireless communication system 8 described herein may comprise one or more wireless devices 300, 300A, 500 and/or one or more network nodes 400, such as one or more of: a base station, an eNB, a gNB and/or an access point.

A wireless transmitter device may be seen as a wireless device intending to perform a sidelink transmission, e.g. contention-based sidelink transmission, such as to transmit data using a sidelink. A wireless device may refer to a mobile device and/or a user equipment, UE. A wireless device is configured to perform transmission and/or reception. For example, a wireless device comprises a transceiver configured to perform transmission and/or reception. A wireless transmitter device may be seen as a wireless device acting as a transmitter in a communication, such as taking the role of the transmitter in a communication. Examples of wireless transmitter devices include a mobile device and/or a user equipment, UE, and/or a wireless modem. A wireless transmitter device may be configured for transmission and/or reception (e.g. when in reception, the wireless transmitter device acts as a receiver device). For example, a wireless transmitter device comprises a transceiver configured to perform transmission and/or reception. The term "wireless transmitter device" and "wireless transmitting device" can be used interchangeably in the present disclosure.

A wireless receiver device may be seen as a wireless device configured to receive, such as to receive data and/or control signalling. A wireless receiver device may comprise a mobile device and/or a user equipment, UE, and/or a wireless modem. A wireless receiver device may be seen as a wireless device acting as a receiver in the communication, such as taking the role of a receiver in a communication. A wireless receiver device may be configured for transmission and/or reception (e.g. when in transmission, the wireless receiver device acts as a transmitter device). For example, a wireless receiver device comprises a transceiver configured to perform transmission and/or reception. The term "wireless receiver device" and "wireless receiving device" can be used interchangeably in the present disclosure.

The wireless device 300A may be configured to communicate with the network node 400 via a wireless link (or radio access link) 10A.

The wireless devices (such as wireless transmitter device 300, and/or wireless device 300A) may be configured to communicate with wireless receiver device 500 using sidelink communication via their respective wireless links 14, 14A.

The wireless transmitter device 300 may be configured to communicate with wireless device 300A using sidelink communication via wireless link 12.

A wireless device 300, 300A, 500 may be configured for sidelink communication for different purposes. Various examples for sidelink communication include communication from or to a wireless device arranged in a vehicle. The Vehicle-to-everything (V2X) communication is a communication between a vehicle and any entity external to the vehicle. V2X operations may be aiming at road safety, traffic efficiency, and energy savings. A vehicular communication system for V2X may include other more specific types of communication, such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X is introduced in Release 16 for 3GPP specifications for wireless communication. V2X services is just one non-limiting example of sidelink communication in which the disclosed technique may be applied.

Sidelink communication may be advantageous in communication in out-of-coverage situations, for example for a wireless device which cannot directly communicate with a network node but can communicate with the network node indirectly with assistance of a relay wireless device (such as wireless device 300A) and sidelink communication. Sidelink communication may be advantageous for communicating directly and/or only with another wireless device that is also out of coverage.

Sidelink communication may include transmission from one or more wireless transmitter devices 300, 300A, and/or reception by one or more receiver wireless devices 300A, 500.

For example, wireless transmitter device 300 configured for sidelink communication may sense the channel configured for sidelink communication to determine if any communication can or is taking place before transmitting.

The wireless receiver device 500 configured for sidelink communication may monitor the channel to check for potential data for reception.

A wireless device capable of side-link communication in NR is provided with a set of resources in time and frequency, referred to as a resource pool (e.g. RxPool, and/or TxPool), for its sidelink communication.

Figure 2:
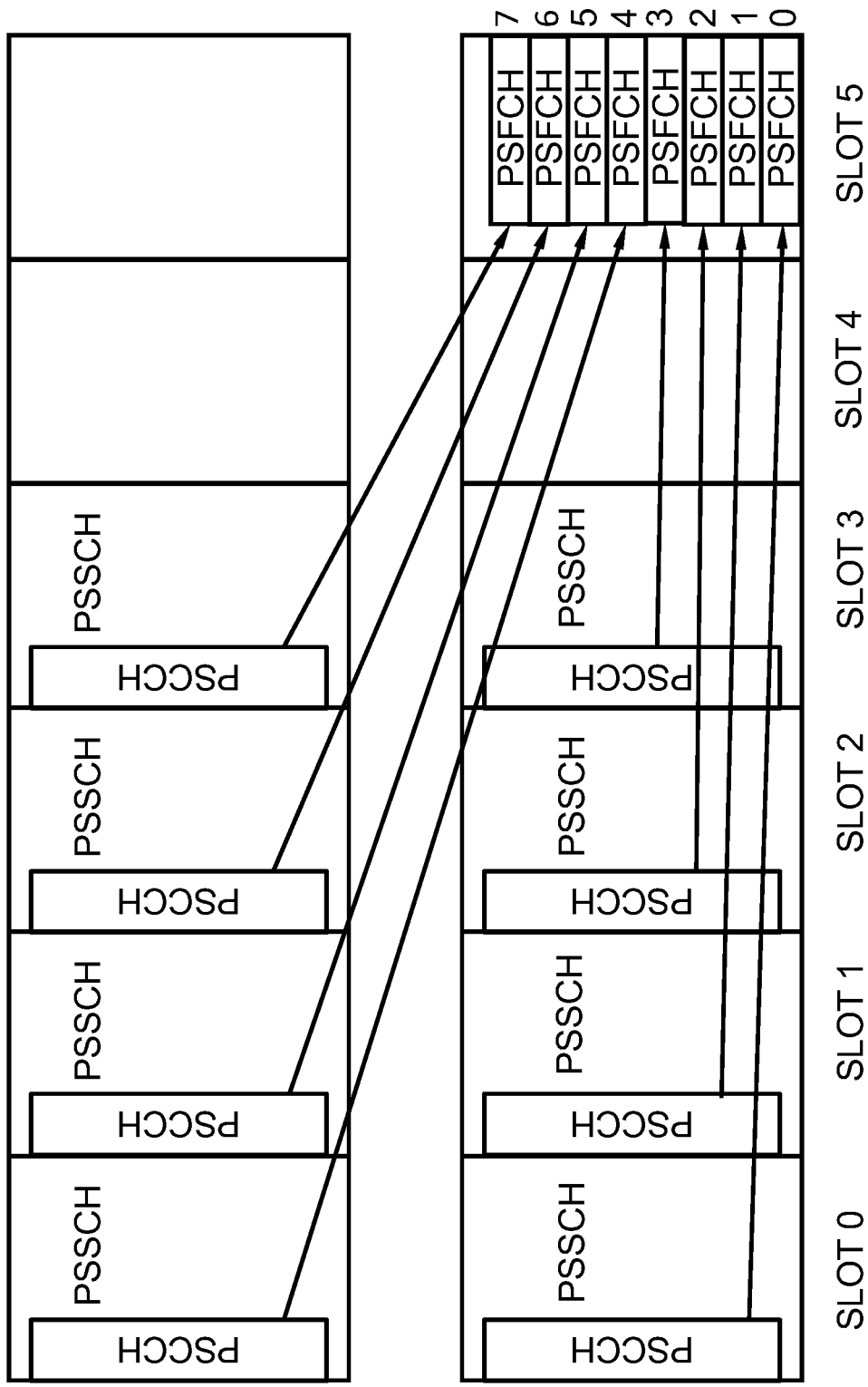
FIG. 2 is a schematic diagram of resources in a resource pool for sidelink communication according to legacy sidelink configuration.

FIG. 2 is a schematic diagram of resources in a resource pool for sidelink communication according to legacy sidelink configuration.

Slot and subchannel are respectively defined in the time domain and frequency domain granularity (see FIG. 2). Parameters used to determine resource pool may include a sub-channel size (e.g. a start of Resource Block (RB) in a sub-channel and number of sub-channels), a time-resource, and periodicity of the resource pool.

The available resources can be divided to a reception resource pool, RxPool and a transmission resource pool, TxPool, for sidelink reception and transmission, respectively. The parameters indicative of RxPool and/or TxPool are provided to wireless devices via (i) either RRC_configuration message, (ii) or as a part of system information in SIB12, and/or (iii) are preconfigured according to sl-PreconfigurationNR (e.g. which is typically used when wireless devices are out-of-coverage).

In sidelink, the Physical Sidelink Control Channel (PSCCH) is used by the wireless device (such as UE) to monitor for potential communication. PSCCH periodicity may be a fixed value given by the minimum delay needed in the system. For example, for traffic safety usage of vehicle to everything, V2X, a wireless device of a pedestrian or another Vulnerable Road User (VRU) may receive information (such as position, speed, and/or type) from vehicles when the wireless device of the pedestrian is close to traffic (such as at crossroads). The wireless device may for example receive the information mainly during rush hour, but also at other times when there may be fast moving vehicles on the same road/path as the wireless device. It is to be noted that the constant monitoring of the sidelink resources leads to a high power consumption of the wireless device.

A sidelink message is sent using resources on the PSCCH and physical sidelink shared channel, PSSCH, channels. The PSCCH transmission may contain Sidelink Control Information, SCI-1, which includes a general sidelink identification, sidelink ID, indicating where the resource is allocated and used. The PSSCH transmission may contain Sidelink Control Information, SCI-2, which includes the target wireless device identifier, which can target a specific wireless device (such as UE, e.g. via unicast), or a group of wireless devices (such as UEs) for a specific service (e.g. via groupcast), or all available wireless devices (such as UEs, e.g. via broadcast).

FIG. 2 shows an example structure of a slot of the Rx Pool according to an example of the prior art, usable for understanding the technique disclosed herein. The slot may comprise resources for PSCCH, resources for PSSCH comprising data and $2^{nd}$ stage SCI.

Furthermore, resources for a physical sidelink feedback channel (PSFCH) are provided for e.g. hybrid automatic repeat request (HARQ) purposes. A slot disclosed herein is illustrative and the present disclosure is not limited to a slot or a slot structure. The present disclosure may be applied to a frame structure and/or to a subframe structure, e.g. in 3GPP TS 38.211, section 4.3.

For sidelink communication, the radio resource management may be performed using resource pools: a transmission resource pool, TxPool and/or a reception resource pool, RxPool. The TxPool and/the RxPool can be signaled by the network node for the in-coverage wireless devices, or preconfigured (such in factory or when in-coverage earlier) for the out-of-coverage wireless devices. A TxPool is associated with an RxPool in order to enable communication. When the wireless device monitors the RxPool for potential data, the wireless device is to monitor all slots and subchannels within the configured RxPool.

The wireless devices configured for sidelink communication can only transmit data using a transmission resource pool, TxPool, within a limited time duration and frequency range and with certain periodicity. All wireless devices with sidelink activated are listening during a resource reception pool, RxPool which includes the TxPool. This way, the wireless devices can hear or receive the transmissions. In other words, the RxPool may be larger than the Tx pool so that a wireless device can listen on wireless devices (such as UEs) using sidelink in adjacent cells as well where the wireless devices may be configured with another TxPool in order to avoid interference between the cells. This way, also reception from wireless devices in neighboring or adjacent cells or from wireless devices out-of-coverage is possible.

In NR sidelink transmissions, the following two modes may be used for resource allocations (from the (pre-)configured side-link resource pool(s) available for transmission): Mode 1; where sidelink resources are scheduled by the network node; Mode 2 where the wireless device autonomously selects sidelink resources based on a channel sensing mechanism, from a pool of resources. For the in-coverage wireless device (such as UE), a network node (such as gNB) can be configured to adopt Mode 1 or Mode 2. For the out-of-coverage wireless device (such as UE), only Mode 2 can be adopted.

The channel sensing procedure in Mode 2 requires a transmitting wireless device (such as UE) to decode all signals in a randomly and/or autonomously selected Tx resource pool e.g. until a Tx resource is found available. This can lead to considerable energy consumption at the wireless device. The present disclosure proposes a solution to reduce the power/energy consumption of transmitting wireless device when operating in Mode 2.

Figure 3:
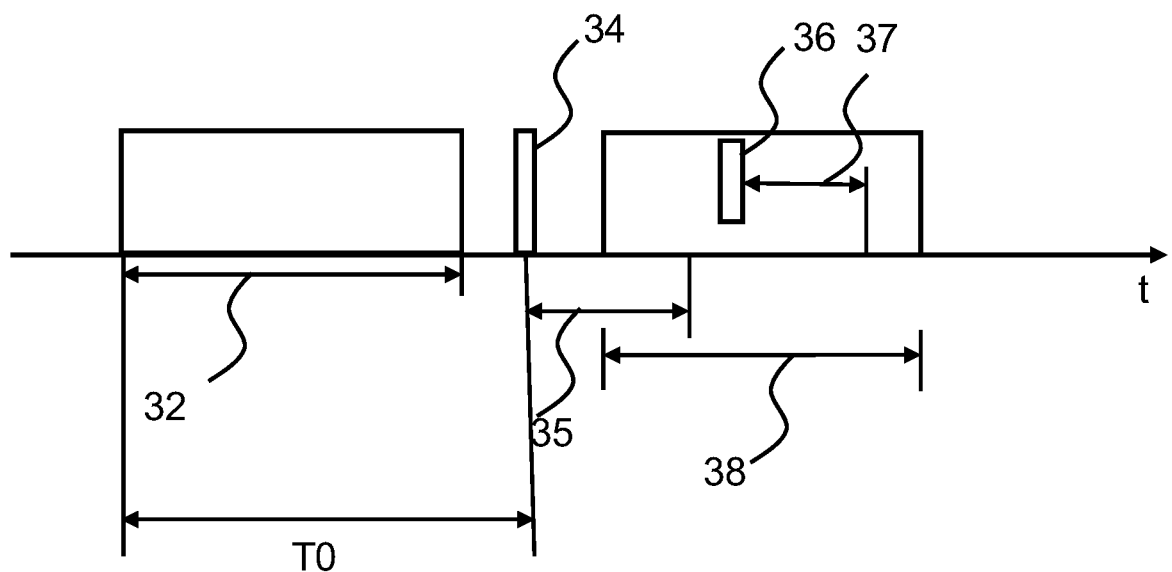
FIG. 3 is a schematic diagram illustrating a legacy sidelink sensing for transmission.

FIG. 3 is a schematic diagram illustrating a legacy sidelink sensing for transmission over time using Mode 2. A transmitting UE in legacy NR side-link communication and using resource allocation mode 2 needs to perform resource selection for its transmission autonomously and through a so-called channel sensing procedure before it initiates any data transmission.

When traffic arrives (e.g. from application layer or upper layers) at a transmitter wireless device (such as UE), the transmitter wireless device (such as UE) needs to autonomously select resources 36, 37 for its control channel, (e.g. PSCCH) and its shared (data) channel, (e.g. PSSCH) and reserve some resources (for example, reserving a specific frequency band for certain period of time 38) for potential re-transmission and potential acknowledgement reception. In order not to interfere with ongoing sidelink transmissions, the resource selection and reservation is done in two steps: a sensing procedure and a resource selection procedure as shown in FIG. 3.

Sensing procedure includes a time window 32 where the transmitting wireless device (such as UE) should find out candidate resources potentially available to be utilized for side-link transmissions. The candidate resources may include resources unoccupied, and resources occupied by ongoing sidelink transmissions but with an acceptable interference level to the transmitting wireless device (such as UE). For this, the transmitting wireless device (such as UE) may measure the reference signals (Demodulation Reference Signals, DMRS) received power (Reference Signal Received Power, RSRP) of all the considered subchannels. When either the RSRP on these subchannels does not exceed an example threshold (e.g. a value of the example threshold is determined by the priority of the transport block, TB, transmission), or a subchannel is not occupied by other side-link transmissions, the subchannel is regarded as a candidate resource in the following selection window; otherwise, a subchannel is not a candidate resource.

To measure the RSRP, a transmitting wireless device (such as UE) needs to know the resources of the PSSCH or alternatively the PSCCH launched by other wireless devices (such as UEs). The transmitting wireless device may detect the 1st-stage SCI launched by other wireless devices (such as UEs). In the 1st-stage, SCI mainly carries the information regarding the PSSCH resources and the information for decoding the 2nd-stage SCI (e.g., time-frequency resources of PSSCH/PSFCH, the priority of this TB transmission, etc.) and is decodable by any wireless device (such as UE) for channel sensing purposes. In other words, no wireless device (such as UE) identifier, ID, is included in the 1st-stage SCI.

After identifying candidate resources at 34 based on the monitored resources during 32, a transmitting wireless device (such as UE) randomizes the selection of candidate resources to launch transmission of PSCCH, PSSCH, and feedback reception of physical sidelink feedback channel, PSFCH, during the selection window 38. When a transmitting wireless device begins launching the PSCCH, PSSCH and receiving feedback on PSFCH, the transmitting wireless device may continue performing resource sensing in period 35.

It is to be noted that the sensing procedure 32 of FIG. 3 is power consuming and introduces long delays (such as T0 of FIG. 3) before each transmission. Resource reservation may render the channel unavailable to other wireless devices even when no (re-)transmission is needed to be performed.

Figure 4:
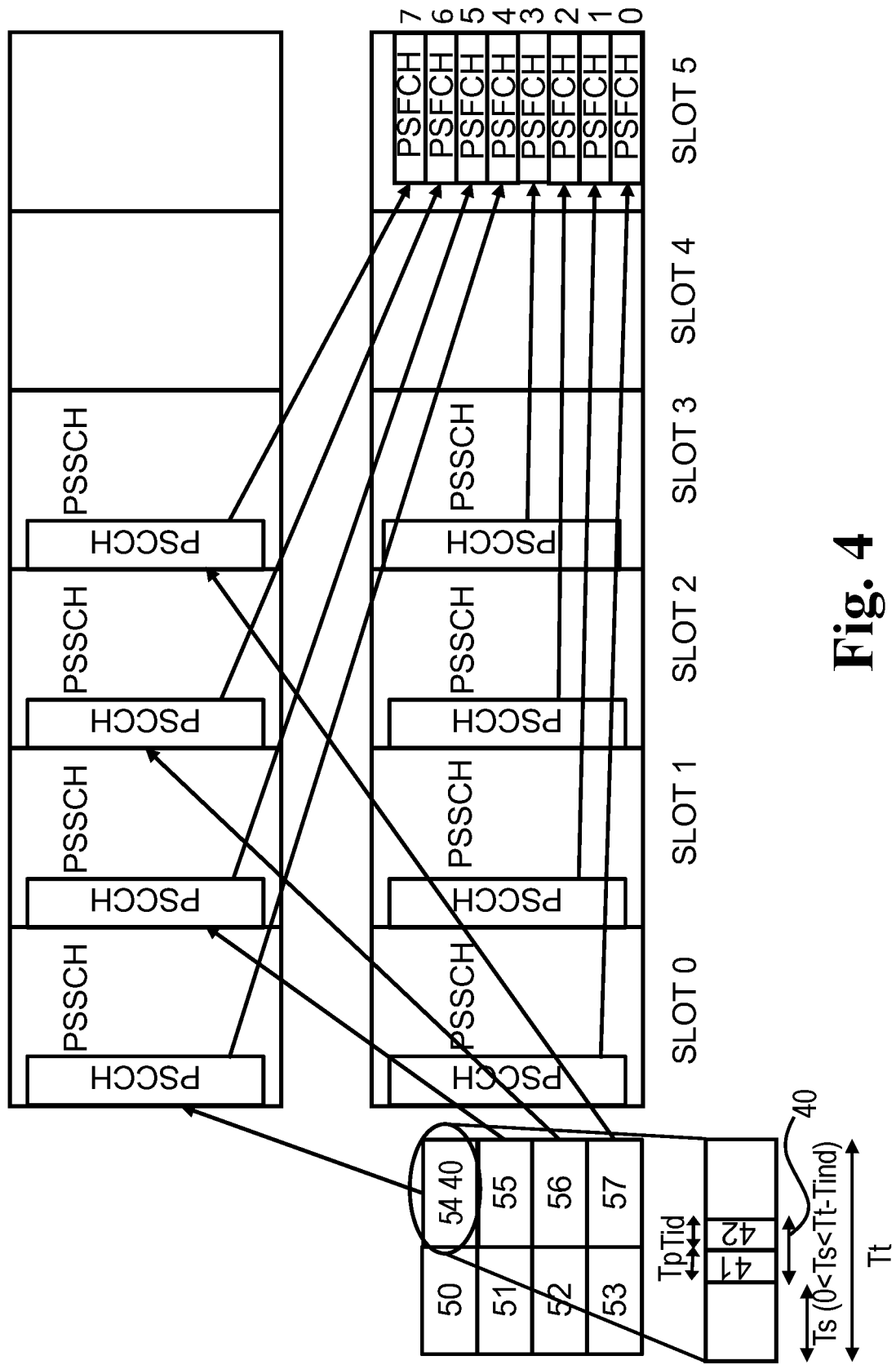
FIG. 4 is a schematic diagram of resources for sidelink communication according to this disclosure.

FIG. 4 is a schematic illustration of resources for sidelink communication according to one example implementation of this disclosure. FIG. 4 shows an example slot structure comprising resources in time and frequency. FIG. 4 shows an example slot structure comprising Tx resources, Rx resources, and reservation resources according to this disclosure. The resources may comprise resources for PSCCH, resources for PSSCH, resources for a PSFCH for e.g. hybrid automatic repeat request (HARQ) purposes. FIG. 4 shows an example reservation resources 50, 51, 52, 53, 54, 55, 56, 57 prior to the resources for PSCCH, resources for PSSCH.

Reservation resource 54 is associated (e.g. pointing to, and/or referring to) with the Tx resource for PSCCH of slot 0. Reservation resource 55 is associated (e.g. pointing to, and/or referring to) with the Tx resource for PSCCH of slot 1. Reservation resource 56 is associated (e.g. pointing to, and/or referring to) with the Tx resource for PSCCH of slot 2. Reservation resource 57 is associated (e.g. pointing to, and/or referring to) with the Tx resource for PSCCH of slot 3.

Alternatively, in some examples, the wireless transmitter device may use reservation resources in sets associated with the transmission resource selected by the wireless Tx device, such as two set in FIG. 4 (e.g. 50-53 as a first set and 54-57 as a second set), so the wireless transmitter device may first select reservation resource 50 among 50, 51, 52, and 53 and does the monitoring procedure in 50, and after monitoring the wireless transmitter device realizes that reservation resource 50 was occupied, the wireless transmitter device may perform a second attempt (e.g. for reservation resource 50, or another reservation resource of the first set, or a reservation resource of the second set) and repeat all the steps above.

For example, a wireless transmitter device that has data for transmission, randomly (e.g. pseudo-randomly) selects a reservation resource 54 (corresponding to a specific transmission resource, e.g. of slot 0 in FIG. 4) dedicated for transmission of a resource reservation signal 40 amongst potential pre-configured reservation resources 50, 51, 52, 53, 54, 55, 56, 57. Alternatively, the wireless transmitter device may select randomly the specific transmission resource and use the corresponding reservation resource associated with the specific transmission resource.

The pre-configured reservation resources are for example part of a resource reservation pool. A resource reservation pool disclosed herein may be seen as a resource pool used by a wireless transmitter device for resource reservation. A resource reservation pool disclosed herein may be seen as a resource pool used by a receiving wireless device to monitor for potential data and also by a transmitting wireless device for sensing and resource selection, e.g. prior to transmission. A resource reservation pool disclosed herein may be seen as a pool of resources used for reserving resources and detecting collisions prior to the actual transmissions. Receiving wireless devices also need to monitor reservation resources of the resource reservation pool for potential resource reservation signals. The resource reservation pool may be seen as an allocation pool. The resource reservation pool is configured to allow a decrease of the risk of collision. The disclosed resource reservation pool may comprise, in order to decrease risk of collision, a plurality of reservation resources where a wireless transmitter device can transmit its request or a resource reservation signal, RRS to allocate the corresponding transmission resources of TxPool for transmission of PSCCH and PSSCH and resources for reception of potential acknowledgment by the target UE. A resource reservation pool may comprise one or more resource reservation blocks. A resource reservation pool may comprise reservation resources distributed in time and/or frequency, or comprises subsequent resources in time and/or frequency. For example, a resource reservation pool may comprise resources to be used for reservation of a transmission resource. Stated differently, the resource reservation pool may comprise separate reservation resources associated with individual transmission resources and each reservation resource is pointing to or associated with the same transmission resource of the TxPool.

A resource reservation signal, RRS, disclosed herein may be seen as a signal or an indicator or a request, used for reserving a Tx resource of or in a TxPool and for avoiding collision in the Tx resource. Time and frequency resources for the transmission and/or reception of the resource reservation signal may be preconfigured. The length of the reservation resources assigned for RRS may be longer than the actual length of the RRS transmission to support channel sensing/monitoring before any RRS transmission. The wireless Rx device may monitor the reservation resource for potential reception of RRS which may indicate that the wireless Rx device is the target wireless Rx device.

The resource reservation signal, RRS, 40 comprises a first part 41 recognizable by any wireless device and a second part 42 dedicated to a target wireless receiver device.

For example, when a wireless transmitter device intends to transmit and selects the reservation resource 54 to transmit the RRS 40, the wireless transmitter device starts sensing or monitoring the channel (e.g. by sensing the reservation resource selected) prior to transmission of 40, e.g. during Ts of 54, and thereafter transmits the first part 41 of the resource reservation signal 40 carried over reservation resource 54, (e.g. a preamble which is known to all UEs). The timing of the transmission of the RRS 40 is randomly selected within the reservation resource 54. The monitoring allows the wireless transmitter device to detect RRS(s) transmitted by one or more other wireless transmitter devices on reservation resource 54 and thereby detect a conflict that may be remedied to avoid collisions.

The timing of the transmission of the RRS 40 may be triggered by the end of the monitoring window. For example, a monitoring window (e.g. illustrated by Ts in FIG. 4) of the reservation resource 54 used to sense the channel may be of a random time period Ts where $0<Ts<Tt-Tind$, with Tt denotes a total time available given by the reservation resource for sensing and transmission of the resource reservation signal and Tind denotes a transmission duration of the RRS 40 ($Tt>2*Tp+Tid$, wherein Tp denotes the transmission duration of the first part 41, and Tid denotes the transmission duration of the second part 42, and $Tind=Tp+Tid$).

The reservation resource 54 is associated with a transmission resource (e.g. of a Physical Sidelink Control Channel, PSCCH, and/or of a Physical Sidelink Shared Channel, PSSCH) selected by the wireless transmitter device for sidelink transmission. For example, the wireless transmitter device can use its low power receiver for sensing since resource reservation signal(s) transmitted by other(s) (e.g. configured with a simple modulation and coding scheme (MCS), e.g. with On Off Keying, OOK, modulation, e.g. with simple spreading technique) are allowed in these reservation resources, thereby leading to low-power sensing compared to legacy side-link sensing. For example, the wireless transmitter device can use a low power receiver for sensing since resource reservation signal(s) transmitted by other(s) are configured with a modulation and coding scheme (MCS) simpler than sidelink communication, (e.g. with On Off Keying, OOK, modulation, and/or Frequency Shift Keying, FSK modulation, and/or, e.g. with less complex spreading technique than the coding and spreading in the sidelink) communication), thereby leading to low-power sensing compared to legacy side-link sensing.

For example, when the received signal strength of a first part (e.g. preamble detection) of a resource reservation signal transmitted by other wireless transmitter device(s) sensed on the reservation resource 54 associated with the transmission resource selected by the wireless transmitter device is above a certain threshold (e.g. level) and the first part is detected, the wireless transmitter device can assume that the resources/channel for both resource reservation signal, RRS 40 and its corresponding transmission resource (e.g. PSCCH/PSSCH) are occupied. When the transmission resource is occupied, the wireless transmitter device may need to wait until the next occasion for transmission of an RRS 40. Alternatively, the wireless transmitter device may first randomly select a reservation resource from a first resource reservation pool corresponding to a first Tx resource and when after sensing there is a collision, the wireless transmitter device may perform a second random selection in the first resource reservation pool or a second resource reservation pool.

For example, when the received signal strength is below a certain threshold or no first part is detected, during sensing or monitoring, the wireless transmitter device may assume that the corresponding Tx resource is available. The wireless transmitter device may start by transmitting its own RRS to the target wireless receiver device to wake the target wireless receiver device up and subsequently transmit data in resources corresponding to Tx resource (e.g. PSCCH and PSSCH). In other words, the RRS may serve as a Wake UP Signal, WUS.

Figure 5:
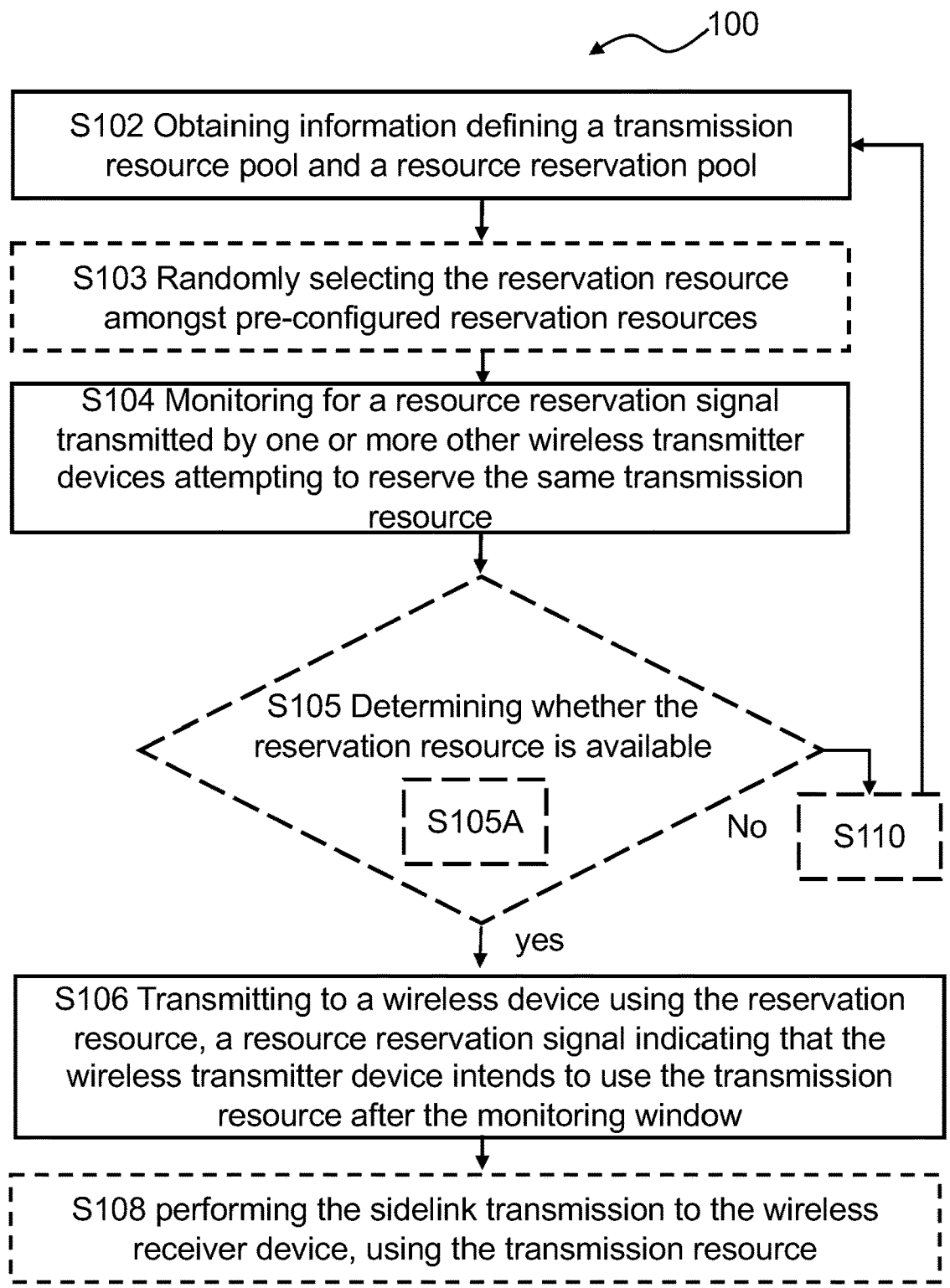
FIG. 5 is a flow-chart illustrating an example method, performed by a wireless transmitter device, for contention-based sidelink transmission according to this disclosure.
Figure 7:
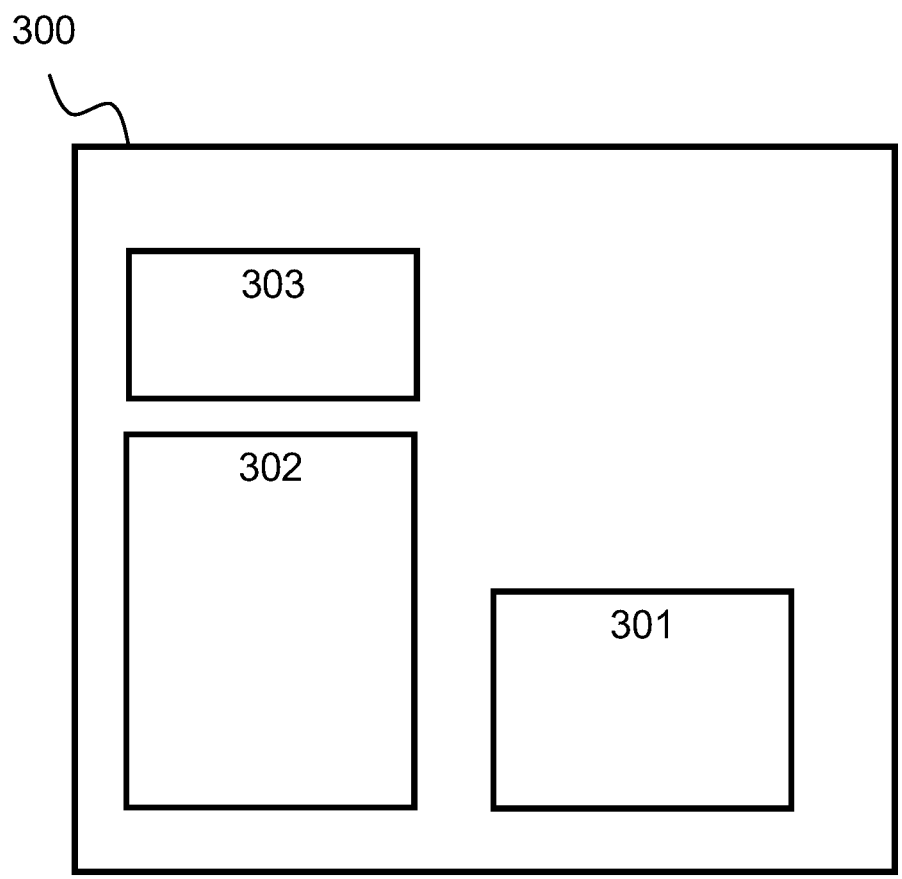
FIG. 7 is a block diagram illustrating an example wireless transmitter device according to this disclosure.

FIG. 5 is a flow chart illustrating an example method 100, performed by a wireless transmitter device (such as the wireless transmitter device disclosed herein, such as wireless transmitter device 300 of FIGS. 7 and 300A of FIG. 1), for contention-based sidelink transmission according to this disclosure.

The method 100 comprises obtaining S102 information defining a transmission resource pool and a resource reservation pool comprising one or more reservation resources associated with respective transmission resources in the transmission resource pool. In one or more example methods, the transmission resource is part of one or more of: a Physical Sidelink Control Channel, PSCCH, and/or a Physical Sidelink Shared Channel, PSSCH. For example, obtaining S101 may comprise receiving and/or retrieving (such as from a memory of the wireless device) information defining the transmission resource pool and the resource reservation pool associated with respective transmission resources in the transmission resource pool. In one or more example methods, the resource reservation pool may be seen as a pool of reservation resources. For example, the resource reservation pool may comprise a first reservation resource, and optionally a second reservation resource, and optionally a third reservation resource. For example, reservation resources are separate resources in time and/or frequency. For example, the first reservation resource is separate, in time and/or in frequency from any other reservation resources of the same reservation resource pool, such as separate from the second reservation resource and/or from the third reservation resource. For example, a reservation resource may be seen as pointing to (i.e. referring to or associated with) a specific transmission resource, as illustrated in FIG. 4. In other words, one reservation resource can be used to reserve a certain corresponding transmission resource of the transmission resource pool. For example, a resource reservation pool and/or its reservation resources enables a reservation of an associated transmission resource. The association of the reservation resource and the transmission resource is illustrated in FIG. 4. In one or more example methods, information indicative of the resource reservation pool is pre-configured in the wireless transmitter device.

In one or more example methods, the method 100 comprises randomly (e.g. pseudo-randomly) selecting S103 the reservation resource amongst pre-configured reservation resources (such as of the resource reservation pool). For example, the random selection of the reservation resource may be performed by a random (e.g. pseudo-random) selection of the transmission resource, and as the transmission resource is associated with a reservation resource or a reservation resource pool, the reservation resource is thereby randomly selected. For example, a timing and frequency relation between the RRS and the subsequent Tx resource (PSCCH and/or PSSCH) are known to the wireless Tx devices. In other words, after detection of the RRS the UE knows when and where in future the transmission over the corresponding Tx resource (PSCCH/PSSCH) is performed. This also means after RRS transmission the Tx resources become reserved for that particular wireless Tx device and other wireless Tx devices are less likely to perform any transmission in those Tx resources.

In the present disclosure, the term "random" or "randomly" refer to "pseudo-random" or "pseudo-randomly".

The method 100 comprises monitoring S104 a reservation resource associated with a transmission resource selected by the wireless transmitter device (e.g. for sidelink transmission) for a resource reservation signal transmitted by one or more other wireless transmitter devices attempting to reserve the same transmission resource. For example, the monitoring S104 is performed using the reservation resource for sensing the presence or absence of the resource reservation signal transmitted by one or more other wireless transmitter devices attempting to reserve the same transmission resource. For example, the wireless transmitter device monitors the reservation resource associated with the transmission resource selected by the wireless transmitter device e.g. to detect a resource reservation signal transmitted by one or more other wireless transmitter devices attempting to reserve the same transmission resource. In other words, for example, during a monitoring window of a reservation resource associated with a transmission resource selected by the wireless transmitter device for sidelink transmission, the wireless transmitter, Tx, device monitors for RRS transmitted by one or more other wireless Tx devices attempting to reserve the same transmission resource. Stated differently, for example, the wireless Tx device selects a transmission resource in the TxPool, and monitors the reservation resource associated with the selected Tx resource to detect RRS transmitted by one or more other wireless Tx devices attempting to reserve the same transmission resource as the one selected by the wireless Tx device. This way, the wireless Tx device may prevent any collision that may happen over the Tx resource, if monitoring S104 is not performed. In one or more example methods, the reservation resource is in time prior to the transmission resource of the transmission resource pool.

In one or more example methods, a size of a monitoring window where the monitoring S104 is performed is randomly (e.g. pseudo-randomly) selected by the wireless transmitter device. The monitoring window may be seen as a time period, prior to transmission S106, used for monitoring and/or sensing the availability of the transmission resource. For example, the monitoring window may be seen as a monitoring period. Optionally, a size of the monitoring window (e.g. in time) is randomly (e.g. pseudo-randomly) selected by the wireless transmitter device. In other words, a duration and/or a length in time of the monitoring window may be randomly selected, e.g. to a random value, e.g. within a certain range of the reservation resource. The duration and/or length can be multiple symbols with the granularity of 1 symbol, e.g. expressed as an integer number of OFDM symbol. In other words, the monitoring window is to monitor frequency resources corresponding the reservation resource associated with the Tx resource. In one or more example methods, the monitoring window is a random period selected to allow time for transmission of the resource reservation signal. The monitoring window may start in line with the start of the reservation resource associated with the transmission resource selected by the wireless transmitter device for sidelink transmission. As illustrated in FIG. 4, the monitoring/sensing window illustrated by Ts starts with reservation resource 54 carrying the RRS 40. The size of the monitoring window may be in time. For example, an end of the monitoring window may be randomly selected between zero and Tt−Tind as illustrated in FIG. 4. The randomly selected window allows a power-efficient collision avoidance.

It may be appreciated that reservation resources allocated for RRS transmission may be always monitored by all wireless Rx devices for potential RRS carrying their own addresses and/or identifiers. The wireless Tx devices can only use the reservation resources for sensing and resource selection when there is data for transmission.

The method 100 comprises transmitting S106, after the monitoring (such as after the monitoring window), to a wireless device, using the reservation resource, a resource reservation signal indicating that the wireless transmitter device intends to use the transmission resource, upon determining based on the monitoring that the transmission resource is available. For example, the wireless Tx device, upon determining based on the monitoring S104 that the transmission resource is available, transmits, after the monitoring (e.g. after the monitoring window, e.g. immediately after the monitoring window, or e.g. at a next transmission time within the time allocated to the reservation resource after the monitoring window of the reservation resource, e.g. after a short delay to switch from Rx to Tx and confirm with the subframe time structure), to a wireless device (such as a wireless Tx and/or Rx device, such as to the intended receiving wireless device), using the reservation resource, a resource reservation signal indicating that the wireless transmitter device intends to use the transmission resource for sidelink transmission. For example, after the monitoring, the wireless transmitter device can transmit, to a wireless device, (such as a wireless Tx device and/or a wireless Rx device, such as to the intended receiving wireless device), using the reservation resource. In one or more example methods, the resource reservation signal serves as a Wake-Up Signal, WUS, of the wireless device (such as a wireless Tx device and/or a wireless Rx device, such as to the intended receiving wireless device) and indicating to at least one other wireless device that the wireless transmitter device intends to use the transmission resource.

The resource reservation signal, RRS, can serve as a Wake-Up Signal, WUS, of the wireless device (such as a wireless Rx device, such as to the intended receiving wireless device) while indicating to at least one other wireless device that the wireless transmitter device intends to use the transmission resource. In one or more example methods, the modulation and coding complexity of the resource reservation signal is lower than a modulation and coding complexity of the sidelink transmission. It may be appreciated that the modulation and coding complexity of the resource reservation signal is lower than a modulation and coding complexity of the sidelink transmission so as to trigger a wake up of a receiver of a wireless receiver device. In other words, the lower complexity of the MCS used for the RRS allows the RRS to be suitable to serve as a WUS. For example, the RRS can be generated using a simple MCS (e.g. having a lower complexity than the MCS used for the sidelink communication). For example, the RRS can be decoded with a low-power and/or low-complexity receiver of the wireless receiver device (such as a receiver operating on ON/OFF Keying, and/or Frequency Shift Keying, FSK), thereby triggering a wake up of the wireless receiver device, e.g. in a power efficient manner.

In one or more example methods, the reservation resource signal is a signal requiring less power than the sidelink transmission. For example, the reservation resource signal is a signal requiring less power than the sidelink transmission for detection at the wireless device receiving the RRS. For example, the RRS is configured to requiring less power than the sidelink transmission at a receiver wireless device, e.g. for demodulation and/or decoding of the RRS.

In one or more example methods, the reservation resource signal comprises a sequence generated based on a predetermined rule and/or a predetermined formula. For example, the reservation resource signal comprises a sequence with or without spreading. For example, the reservation resource signal can comprise a particular symbol sequence generated based on a predetermined rule and/or a predetermined formula (e.g. one or more of: PN sequence, m-sequence, gold sequence, Kasami sequence, Zadoff-Chu sequence). No fine tune synchronization may be needed for its detection (as opposed to SCI/PSCCH).

A timing of the transmission S106 of the resource reservation signal is randomly (e.g. pseudo-randomly) selected by the wireless transmitter device. For example, a timing of the transmission S106 may be seen as a point in time where the transmission of the resource reservation signal occurs. The method 100 may comprise randomly selecting a timing of the transmission S106 of the resource reservation signal. In other words, the resource reservation signal is transmitted by the wireless transmitter device at a randomly selected time within the time period allocated to the reservation resource after the monitoring. This leads to the RRSs from different wireless transmitter devices to be transmitted at different and random points in time in the reservation resource. For example, the monitoring window having a randomly selected size may be used to schedule the randomly selected timing of the transmission S106. It may be appreciated that given that the wireless transmitter device transmits the RRS at a random time within the reservation resource, RRSs from different wireless transmitter devices will be transmitted at different and random points in time in the reservation resource. The transmission S106 may be seen as improving collision avoidance for the transmission over the Tx resource in that the transmission S106 indicates to other wireless transmitter device(s) that the wireless Tx device is about to transmit in the selected Tx resource. This way, the other wireless transmitter device(s) can refrain from transmitting on the selected Tx resource.

It may be appreciated that as the monitoring window is of a randomly selected size (e.g. length and/or duration), and given that the wireless transmitter device transmits the RRS directly, immediately and/or promptly (i.e. with a negligible or no delay) after the monitoring window, RRSs from different wireless transmitter devices will be transmitted at different and random points in time in the reservation resource. A negligible delay (e.g. a small time gap) may be needed, for example, for the device to perform measurement, and also for the transition operation in the device to switch from the reception to transmission mode. The transmission S106 may be seen as improving collision avoidance for the transmission over the Tx resource in that the transmission S106 indicates to other wireless transmitter device(s) that the wireless Tx device is about to transmit in the selected Tx resource. This way, the other wireless transmitter device(s) can refrain from transmitting on the selected Tx resource.

In one or more example methods, the transmission S106 of the resource reservation signal upon determining based on the monitoring that the transmission resource is available is performed immediately after the monitoring S104, such as after the monitoring window. For example, the resource reservation signal may be transmitted in S106 after the monitoring has ended, such as after the monitoring window has ended. It may be appreciated that the transmission S106 of the RRS also depends on the outcome of the monitoring S104, and when the monitoring shows that the transmission resource is available, the RRS can be transmitted in S106 after the monitoring has ended.

In one or more example methods, the resource reservation signal comprises a first part recognizable by any wireless device. In one or more example methods, the resource reservation signal comprises a second part dedicated to a target wireless receiver device (e.g. identifying a target wireless Rx device). For example, the method 100 may comprise decoding the first part when the first part of RRS detected during the monitoring S104. For example, the wireless transmitter device can use its lower power receiver for decoding the RRS from other wireless Tx device(s) since resource reservation signals are configured with a simple modulation and coding scheme (MCS), thereby leading to low-power sensing compared to legacy side-link sensing. For example, the RRS can have a simple (e.g. having a lower complexity than the MCS used for the sidelink communication) modulation and coding scheme (MCS) and can be decoded with a low-power low-complexity receiver (such as a wireless receiver device operating on ON/OFF Keying, and/or Frequency Shift Keying, FSK). A simple MCS can be applied to the RRS part that carry data and/or information, e.g. a wireless device identifier, e.g. UE ID. In one or more example methods, the first part comprises a preamble recognizable by one or more wireless receiver devices The first part (e.g. a preamble part) can be in a form of reference signal and/or sequence with or without spreading. For example, the first part may be seen as a particular symbol sequence generated based on a predetermined rule and/or a predetermined formula (e.g. one or more of: PN sequence, m-sequence, gold sequence, Kasami sequence, Zadoff-Chu sequence). No fine tune synchronization is needed for its detection (as opposed to SCI/PSCCH). In one or more examples, the RRS may serve as a wakeup signal, WUS.

In one or more example methods, the resource reservation signal transmitted by the wireless transmitter device is indicative of an identifier associated with the target wireless receiver device. In one or more example methods, the identifier is configured to identify the target wireless receiver device and/or a group of wireless receiver devices to which the target wireless receiver device belongs. In one or more example methods, the second part comprises the identifier. For example, the first part may comprise a preamble or an indicator or identifier that is known for all wireless devices. For example, the second part may comprise a destination identifier, ID, only known to the target UE(s), such as one or more UEs. For example, the preamble is used by the UE Tx for channel sensing and by UE Rx for potential a sidelink message. The second part may be used by the wireless Tx device to address a certain UE (for unicast) or group of UEs (for multicast/broadcast)). For example, the wireless Rx device does not need to continue processing if there is no preamble.

In one or more example methods, a size of the reservation resource allows for the monitoring S104 of resource reservation transmitted by other wireless devices and for transmission S106 of the resource reservation signal. For example, the resource reservation is longer than the actual duration of the transmission of the resource reservation signal to allows for sensing and RRS transmission. For example, the size of the reservation resource in time and/or frequency allows for the monitoring S104 of resource reservation transmitted by other wireless devices and for transmission S106 of the resource reservation signal.

In one or more example methods, the method 100 comprises determining S105 whether the reservation resource is available. In one or more example methods, the determining S105 comprises determining S105A whether the monitoring S104 satisfies a criterion. The criterion may be based on a threshold. For example, the monitoring S104 may satisfy the criterion when a level of the first part of the RRS from other wireless transmitter, Tx, device(s) is below a threshold or no preamble is detected. In one or more example methods, the monitoring S104 satisfies a criterion when a level of the received reservation signal is below a threshold. In one or more example methods, the monitoring S104 satisfies a criterion when no reservation signal is detected in S104. For example, as illustrated in FIG. 4, when the received signal strength of the first part of the RRS is below a certain threshold or no first part is detected, during sensing period, the wireless transmitter device may assume that the corresponding Tx resource is available. The wireless transmitter device may start by transmitting the RRS to the target wireless receiver device to wake the target wireless receiver device up and also transmit data in resources corresponding to Tx resource (e.g. PSCCH and PSSCH).

In one or more example methods, the method 100 comprises performing S108, the sidelink transmission to the wireless receiver device, using the transmission resource, after the transmission S106 of the resource reservation signal. The sidelink transmission S108 may be performed depending on the result of the sensing, e.g. depending on whether the transmission resource is determined in S105 as available or occupied. It may be appreciated that the disclosed technique allows wireless Tx devices with limited battery resources to benefit from a lower-power receiver sensing mechanism before initiating a sidelink transmission.

In one or more example methods, the method 100 comprises upon determining based on the monitoring that the reservation resource is not available, waiting S110 for a next transmission pool (e.g. to perform again the method 100 in the next transmission pool) when data is in a transmission buffer of the wireless transmitter device. For example, when the received signal strength of the first part (e.g. preamble detection) of the resource reservation signal monitored on a reservation resource associated with a transmission resource selected by the wireless transmitter device is above a certain threshold (e.g. level) or the first part is detected, the wireless transmitter device can assume that the resources/channel for both resource reservation signal, RRS and its corresponding transmission resource (e.g. PSCCH/PSSCH) are occupied. When the transmission resource is occupied, the wireless transmitter device may need to wait until the next occasion for transmission of an RRS according to method 100. Alternatively, the wireless transmitter device may first randomly select a reservation resource from a first resource reservation pool in a first channel (corresponding to a first Tx resource) and when after sensing there is a collision, the wireless transmitter device may perform a second random selection in the first resource reservation pool or a second resource reservation pool. In other words, the resource reservation pool can be split in e.g. two or more sets, where the wireless transmitter device can try a first set, corresponding to a part of the TxPool resources, if it fails there is another chance for reserving some of the rest of the TxPool resources in the other part of the resource reservation pool (or second resource reservation pool). Alternatively or additionally, the resource reservation pool may be repeated, and the repetitions may correspond to separate TxPools. In other words, when a conflict occurs, the wireless transmitter device may attempt again on the next Tx pool.

Figure 6:
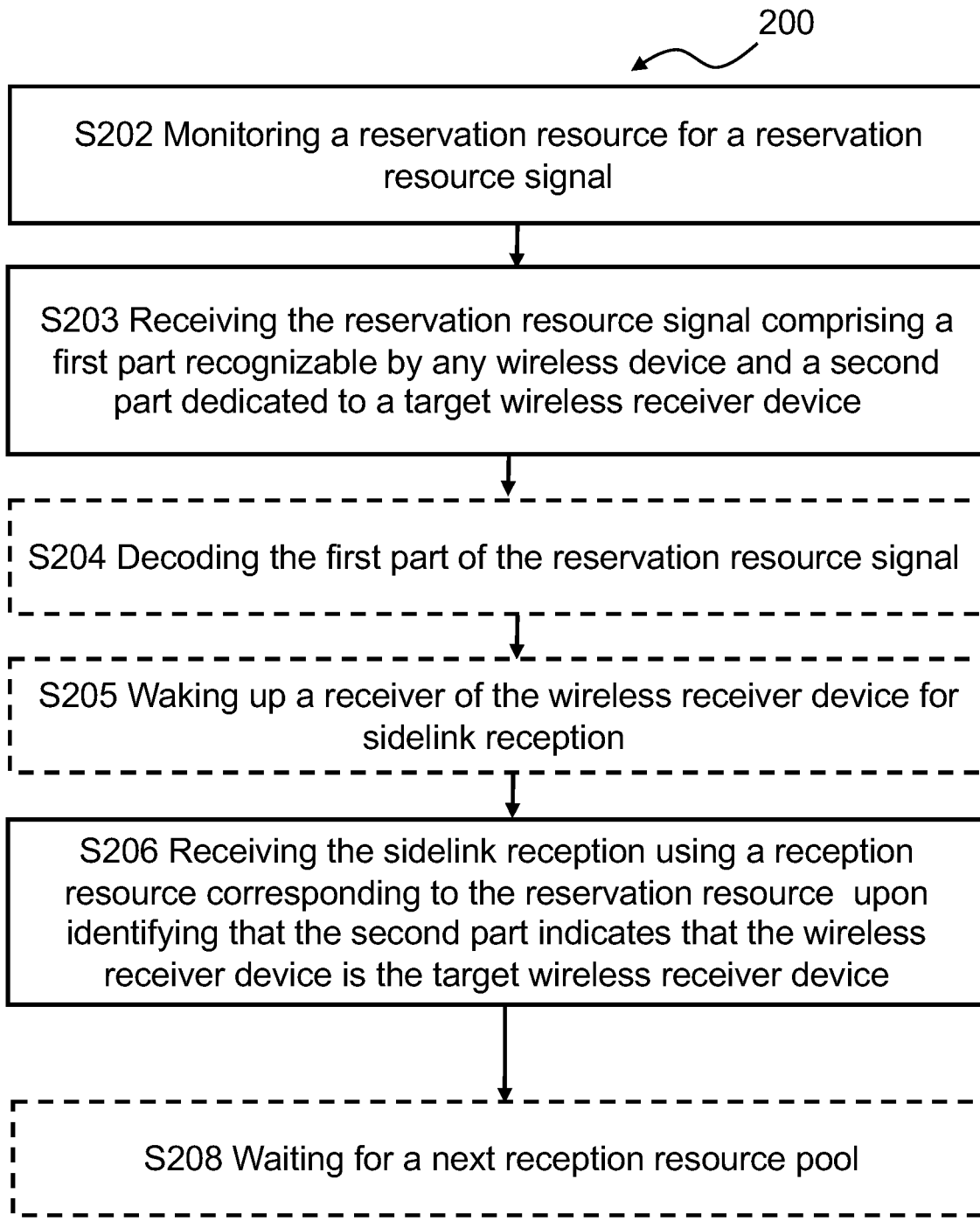
FIG. 6 is a flow-chart illustrating an example method, performed by a wireless receiver device, for contention-based sidelink reception according to this disclosure.
Figure 8:
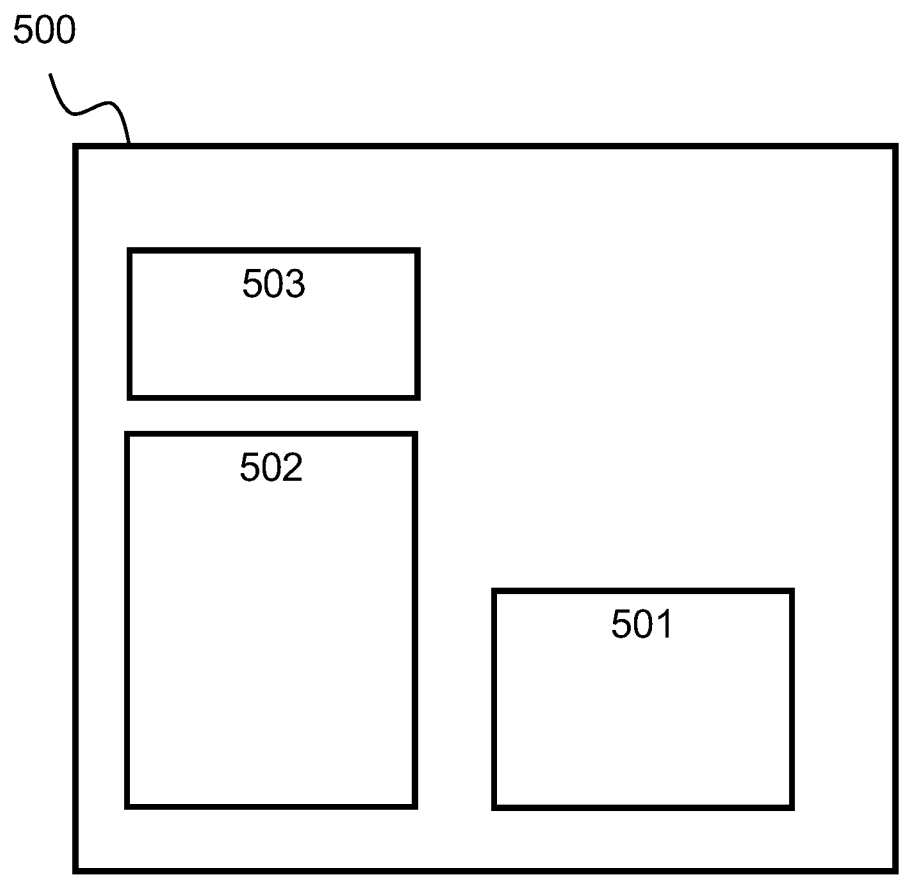
FIG. 8 is a block diagram illustrating an example wireless receiver device according to this disclosure.

FIG. 6 is a flow chart illustrating an example method 200, performed by a wireless receiver device (such as the wireless receiver device disclosed herein, such as wireless receiver device 500 of FIG. 8 and FIG. 1), for sidelink reception according to the disclosure.

The method 200 comprises monitoring S202 a reservation resource for a reservation resource signal. The reservation resource is dedicated to communication of reservation resource signals. The reservation resource may form part of a reservation resource pool. The reservation resource signal, RSS, can have the purpose of waking up the wireless device and/or the purpose of indicating to other wireless device its intention of communicating. Stated differently, for example, reservation resource signal is of lower complexity than the sidelink transmission and reservation resource signal serves a dual purpose of WUS and contention resolution.

The method 200 comprises receiving S203, from a wireless transmitter device, the reservation resource signal comprising a first part recognizable by any wireless device and a second part dedicated to a target wireless receiver device. This may correspond to S106 of FIG. 5. The resource reservation signal, RRS, can serve as a Wake-Up Signal, WUS, of the wireless device while indicating to other wireless devices that the wireless transmitter device intends to use the transmission resource.

In one or more example methods, the resource reservation signal transmitted by the wireless transmitter device is indicative of an identifier associated with the target wireless receiver device. For example the identifier is configured to identify the target wireless receiver device and/or a group of wireless receiver devices to which the target wireless receiver device belongs. In one or more example methods, the second part comprises the identifier. The second part may be used by the wireless Rx device to identify whether the reservation resource signal targets the wireless Rx device or not. For example, the wireless Rx device does not need to continue processing if there is no preamble and/or its identifier is not indicated in the second part.

In one or more example methods, the method 200 comprises decoding S204 the first part of the reservation resource signal. For example, the RRS can have a simple modulation and coding scheme (MCS) and can be decoded with a low-power low-complexity receiver. A simple MCS can be applied to the RRS part that carry data and/or information, e.g. a wireless device identifier, e.g. UE ID. In one or more example methods, the first part comprises a preamble recognizable by one or more wireless receiver devices.

The first part (e.g. a preamble part) can be in a form of reference signal and/or sequence with or without spreading. Fine tune synchronization may not be needed for its detection (as opposed to SCI/PSCCH). In one or more examples, the RRS may serve as a wakeup signal, WUS. For example, the RRS may server as a WUS of the wireless device, such as the wireless device receiving the WUS, such as a receiving wireless device.

In one or more example methods, the method 200 comprises waking up S205 a receiver of the wireless receiver device for sidelink reception, e.g. S206, e.g. upon identifying that the second part of the RRS indicates that the wireless receiver device is the target wireless receiver device. The modulation and coding complexity of the resource reservation signal is lower than a modulation and coding complexity of the sidelink transmission, thereby allowing the RRS to serve as a WUS. Stated differently, reservation resource signal is of lower complexity than the sidelink transmission and reservation resource signal serves a dual purpose of WUS and contention resolution.

The method 200 comprises receiving S206 the sidelink reception using a reception resource corresponding to the reservation resource upon identifying that the second part indicates that the wireless receiver device is the target wireless receiver device. This may correspond to S108 of FIG. 5.

In one or more example methods, the reservation resource signal is indicative of the reception resource reserved for sidelink reception.

In one or more example methods, the reception resource is part of one or more of: a Physical Sidelink Control Channel, PSCCH, and/or a Physical Sidelink Shared Channel, PSSCH.

In one or more example methods, the reception resource is part of a reception resource pool.

In one or more example methods, the method 200 comprises upon identifying that the second part does not indicate that the wireless receiver device is the target wireless receiver device, waiting S208 for a next reception resource pool, which may serve as a Wake Up Signal, WUS, for the reception resource pool.

In one or more example methods, a demodulation and/or decoding complexity of the resource reservation signal is lower than a demodulation and/or decoding complexity of the sidelink reception.

In one or more example methods, the reservation resource signal is a signal requiring less power in demodulation and/or decoding than the sidelink reception.

FIG. 7 shows a block diagram of an example wireless transmitter device 300 according to the disclosure. The wireless transmitter device 300 comprises memory circuitry 301, processor circuitry 302, and a wireless interface 303. The wireless transmitter device 300 may be configured to perform any of the methods disclosed in FIG. 5. In other words, the wireless transmitter device 300 may be configured for contention-based sidelink transmission.

The wireless transmitter device 300 is configured to obtain (such as using the processor circuitry 302 and/or the wireless interface 303) information defining a transmission resource pool and a resource reservation pool comprising one or more reservation resources associated with respective transmission resources in the transmission resource pool.

The wireless transmitter device 300 is configured to monitor (such as using the processor circuitry 302 and/or the wireless interface 303) a reservation resource associated with a transmission resource selected by the wireless transmitter device for sidelink transmission, for a resource reservation signal transmitted by one or more other wireless transmitter devices attempting to reserve the same transmission resource.

The wireless transmitter device 300 is configured to transmit (such as via the wireless interface 303) to a wireless device, using the reservation resource, a resource reservation signal indicating that the wireless transmitter device intends to use the transmission resource after the monitoring and upon determining based on the monitoring that the transmission resource is available. The resource reservation signal, RRS, can serve as a wake up signal, WUS, for the wireless device (e.g. the receiving wireless device) while also indicating that the wireless transmitter device intends to use the transmission resource.

A timing of the transmission of the resource reservation signal is randomly selected by the wireless transmitter device.

The wireless interface 303 is configured for wireless communications via a wireless communication system, such as a 3GPP system, such as a 3GPP system supporting one or more of: New Radio, NR, and LTE. It may be envisaged for Narrow-band IoT, NB-IoT, and Long-Term Evolution-enhanced Machine Type Communication, LTE-M. The wireless interface 303 may comprise transceiver circuitry including receiver circuitry and transmitter circuitry.

The wireless transmitter device 300 is optionally configured to perform any of the operations disclosed in FIG. 5 (such as any one or more of S103, S105, S105A, S108, S110). The operations of the wireless transmitter device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless transmitter device 300 may be considered a method that the wireless transmitter device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 7). Memory circuitry 301 is considered a non-transitory computer readable medium.

Memory circuitry 301 may be configured to store information such as information defining a transmission resource pool and a resource reservation pool, and pre-configured reservation resources in a part of the memory.

FIG. 8 shows a block diagram of an example wireless receiver device 500 according to the disclosure. The wireless receiver device 500 comprises memory circuitry 501, processor circuitry 502, and a wireless interface 503. The wireless receiver device 500 may be configured to perform any of the methods disclosed in FIG. 6. In other words, the wireless receiver device 500 may be configured for sidelink reception.

The wireless receiver device 500 is configured to monitor (such as using the processor circuitry 502 and/or the wireless interface 503) a reservation resource for a reservation resource signal.

The wireless receiver device 500 is configured to receive (such as via the wireless interface 503), from a wireless Tx device, the reservation resource signal comprising a first part recognizable by any wireless device and a second part dedicated to a target wireless receiver device.

The wireless receiver device 500 is configured to receive (such as via the wireless interface 503) the sidelink reception using a reception resource corresponding to the reservation resource upon identifying that the second part indicates that the wireless receiver device is the target wireless receiver device. In other words, the wireless receiver device 500 may be configured to receive a RRS using the reservation resources indicating that the wireless Rx device is the target wireless Rx device, which then receives a communication using the reception resource based on the reservation.

The wireless interface 503 is configured for wireless communications via a wireless communication system, such as a 3GPP system, such as a 3GPP system supporting one or more of: New Radio, NR. It may be envisaged for Narrowband IoT, NB-IoT, and Long Term Evolution-enhanced Machine Type Communication, LTE-M. The wireless interface 503 may comprise transceiver circuitry including receiver circuitry and transmitter circuitry.

The wireless device 500 is optionally configured to perform any of the operations disclosed in FIG. 6 (such as any one or more of S203, S204, S205, S206, S208). The operations of the wireless receiver device 500 may be embodied in the form of executable logic routines (for example, lines of code, software programs, etc.) that are stored on a non-transitory computer readable medium (for example, memory circuitry 501) and are executed by processor circuitry 502).

Furthermore, the operations of the wireless receiver device 500 may be considered a method that the wireless receiver device 500 is configured to carry out. Also, while the described functions and operations may be implemented in software, such functionality may also be carried out via dedicated hardware or firmware, or some combination of hardware, firmware and/or software.

Memory circuitry 501 may be one or more of a buffer, a flash memory, a hard drive, a removable media, a volatile memory, a non-volatile memory, a random access memory (RAM), or other suitable device. In a typical arrangement, memory circuitry 501 may include a non-volatile memory for long term data storage and a volatile memory that functions as system memory for processor circuitry 502. Memory circuitry 501 may exchange data with processor circuitry 502 over a data bus. Control lines and an address bus between memory circuitry 501 and processor circuitry 502 also may be present (not shown in FIG. 8). Memory circuitry 501 is considered a non-transitory computer readable medium.

Memory circuitry 501 may be configured to store information (such as reservation resource, reception resource, RxPool) in a part of the memory.

Examples of methods and products (network node and wireless device) according to the disclosure are set out in the following items:

Item 1. A method, performed by a wireless transmitter device, for contention-based sidelink transmission, the method comprising:
obtaining (S102) information defining a transmission resource pool and a resource reservation pool comprising one or more reservation resources associated with respective transmission resources in the transmission resource pool,
monitoring (S104) a reservation resource associated with a transmission resource selected by the wireless transmitter device for sidelink transmission, for a resource reservation signal transmitted by one or more other wireless transmitter devices attempting to reserve the same transmission resource, and
upon determining based on the monitoring that the transmission resource is available, transmitting (S106), after the monitoring, to a wireless device, using the reservation resource, a resource reservation signal indicating that the wireless transmitter device intends to use the transmission resource and optionally serving as a Wake-Up Signal, WUS, of the wireless device,
wherein a timing of the transmission (S106) of the resource reservation signal is randomly selected by the wireless transmitter device; and optionally wherein the modulation and coding complexity of the resource reservation signal is lower than a modulation and coding complexity of the sidelink transmission.

Item 2. The method according to item 1 wherein the reservation resource signal is a signal requiring less power than the sidelink transmission.

Item 3. The method according to any of the previous items, wherein the reservation resource signal comprises a sequence generated based on a predetermined rule and/or a predetermined formula.

Item 4. The method according to any of the previous items, wherein a size of a monitoring window where the monitoring (S104) is performed is randomly selected by the wireless transmitter device.

Item 5. The method according to any of the previous items, wherein the transmission (S106) of the resource reservation signal upon determining based on the monitoring that the transmission resource is available is performed immediately after the monitoring (S104).

Item 6. The method according to any of the previous items, the resource reservation signal comprises a first part recognizable by any wireless device and a second part dedicated to a target wireless receiver device.

Item 7. The method according to any of the previous items, the method comprising randomly selecting (S103) the reservation resource amongst pre-configured reservation resources.

Item 8. The method according to any of the previous items, wherein the transmission resource is part of one or more of: a Physical Sidelink Control Channel, PSCCH, and/or a Physical Sidelink Shared Channel, PSSCH.

Item 9. The method according to any of the previous items, the method comprising performing (S108), the sidelink transmission to the wireless receiver device, using the transmission resource, after the transmission (S106) of the resource reservation signal.

Item 10. The method according to any of the previous items, wherein the reservation resource is in time prior to the transmission resource of the transmission resource pool.

Item 11. The method according to any of the previous items, wherein a size of the reservation resource allows for the monitoring (S104) of resource reservation transmitted by other wireless devices and for transmission (S106) of the resource reservation signal.

Item 12. The method according to any of items 6-11, wherein the resource reservation signal transmitted by the wireless transmitter device is indicative of an identifier associated with the target wireless receiver device.

Item 13. The method according to item 12, wherein the identifier is configured to identify the target wireless receiver device and/or a group of wireless receiver devices to which the target wireless receiver device belongs.

Item 14. The method according to any of items 12-13, wherein the second part comprising the identifier.

Item 15. The method according to any of items 6-14, wherein the first part comprises a preamble recognizable by one or more wireless receiver devices.

Item 16. The method according to any of the previous items, the method comprising determining (S105) whether the reservation resource is available.

Item 17. The method according to item 16, wherein the determining (S105) comprises determining (S105A) whether the monitoring (S104) satisfies a criterion.

Item 18. The method according to item 17, wherein the monitoring (S104) satisfies a criterion when a level of the received reservation signal is below a threshold.

Item 19. The method according to item 17, wherein the monitoring (S104) satisfies a criterion when no reservation signal is detected in (S104).

Item 20. The method according to any of the previous items, wherein the monitoring window is a random period selected to allow time for transmission of the resource reservation signal.

Item 21. The method according to any of the previous items, the method comprising upon determining based on the monitoring that the reservation resource is not available, waiting (S110) for a next transmission pool when data is in a transmission buffer of the wireless transmitter device.

Item 22. A method, performed by a wireless receiver device, for sidelink reception, the method comprising:
monitoring (S202) a reservation resource for a reservation resource signal;
receiving (S203) the reservation resource signal comprising a first part recognizable by any wireless device and a second part dedicated to a target wireless receiver device; and
upon identifying that the second part indicates that the wireless receiver device is the target wireless receiver device, receiving (S206) the sidelink reception using a reception resource corresponding to the reservation resource.

Item 23. The method according to item 22, the method comprising decoding (S204) the first part of the reservation resource signal.

Item 24. The method according to any of items 22-23, wherein the first part comprises a preamble recognizable by one or more wireless receiver devices.

Item 25. The method according to any of items 22-24, the method comprising waking up (S205) receiver circuitry of the wireless receiver device for sidelink reception.

Item 26. The method according to any of items 22-25, wherein the reservation resource signal is indicative of the reception resource reserved for sidelink reception.

Item 27. The method according to item 26, wherein the reception resource is part of one or more of: a Physical Sidelink Control Channel, PSCCH, and/or a Physical Sidelink Shared Channel, PSSCH.

Item 28. The method according to any of items 22-27, wherein the reception resource is part of a reception resource pool.

Item 29. The method according to any of items 22-28, the method comprising upon identifying that the second part does not indicate that the wireless receiver device is the target wireless receiver device, waiting (S208) for a next reception resource pool.

Item 30. The method according to any of items 22-29, wherein a demodulation and/or decoding complexity of the resource reservation signal is lower than a demodulation and/or decoding complexity of the sidelink reception.

Item 31. The method according to any of items 22-30 wherein the reservation resource signal is a signal requiring less power in demodulation and/or decoding than the sidelink reception.

Item 32. A wireless transmitter device comprising memory circuitry, processor circuitry, and a wireless interface, wherein the wireless transmitter device is configured to perform any of the methods according to any of items 1-21.

Item 33. A wireless receiver device comprising memory circuitry, processor circuitry, and a wireless interface, wherein the wireless receiver device is configured to perform any of the methods according to any of items 22-31.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-8 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a wireless transmitter device, for contention-based sidelink transmission, the method comprising:
    obtaining information defining a transmission resource pool and a resource reservation pool comprising one or more reservation resources associated with respective transmission resources in the transmission resource pool;
    monitoring a reservation resource associated with a transmission resource selected by the wireless transmitter device for sidelink transmission, for a resource reservation signal transmitted by one or more other wireless transmitter devices attempting to reserve the same transmission resource; and
    upon determining based on the monitoring that the transmission resource is available, transmitting, after the monitoring, to a wireless device, using the reservation resource, a resource reservation signal serving as a Wake-Up Signal (WUS) of the wireless device and indicating to other wireless devices that the wireless transmitter device intends to use the transmission resource;
    wherein a timing of the transmission of the resource reservation signal is randomly selected by the wireless transmitter device; and wherein the modulation and coding complexity of the resource reservation signal is lower than a modulation and coding complexity of the sidelink transmission.

2. The method according to claim 1, wherein the reservation resource signal is a signal requiring less power than the sidelink transmission.

3. The method according to claim 1, wherein the reservation resource signal comprises a sequence generated based on a predetermined rule and/or a predetermined formula.

4. The method according to claim 1, wherein a size of a monitoring window where the monitoring is performed is randomly selected by the wireless transmitter device.

5. The method according to claim 1, wherein the transmission of the resource reservation signal upon determining based on the monitoring that the transmission resource is available is performed immediately after the monitoring.

6. The method according to claim 1, the resource reservation signal comprises a first part recognizable by any wireless device and a second part dedicated to a target wireless receiver device.

7. The method according to claim 1, the method comprising randomly selecting the reservation resource amongst pre-configured reservation resources.

8. The method according to claim 1, wherein the transmission resource is part of one or more of: a Physical Sidelink Control Channel (PSCCH) and/or a Physical Sidelink Shared Channel (PSSCH).

9. The method according to claim 1, the method comprising performing, the sidelink transmission to the wireless receiver device, using the transmission resource, after the transmission of the resource reservation signal.

10. The method according to claim 1, wherein the reservation resource is in time prior to the transmission resource of the transmission resource pool.

11. The method according to claim 1, wherein a size of the reservation resource allows for the monitoring of resource reservation transmitted by other wireless devices and for transmission of the resource reservation signal.

12. The method according to claim 6, wherein the resource reservation signal transmitted by the wireless transmitter device is indicative of an identifier associated with the target wireless receiver device.

13. The method according to claim 12, wherein the second part comprises an identifier configured to identify the target wireless receiver device and/or a group of wireless receiver devices to which the target wireless receiver device belongs.

14. The method according to claim 12, wherein the second part comprising the identifier.

15. The method according to claim 6, wherein the first part comprises a preamble recognizable by one or more wireless receiver devices.

16. The method according to claim 1, the method comprising determining whether the reservation resource is available.

17. The method according to claim 16, wherein the determining comprises determining whether the monitoring satisfies a criterion.

18. The method according to claim 17, wherein the monitoring satisfies a criterion when a level of the received reservation signal is below a threshold.

19. The method according to claim 17, wherein the monitoring satisfies a criterion when no reservation signal is detected in.

* * * * *